(No Model.)
G. SCHUBERT.
BALE OR BUNDLE WIRING TOOL.
No. 502,323. Patented Aug. 1, 1893.
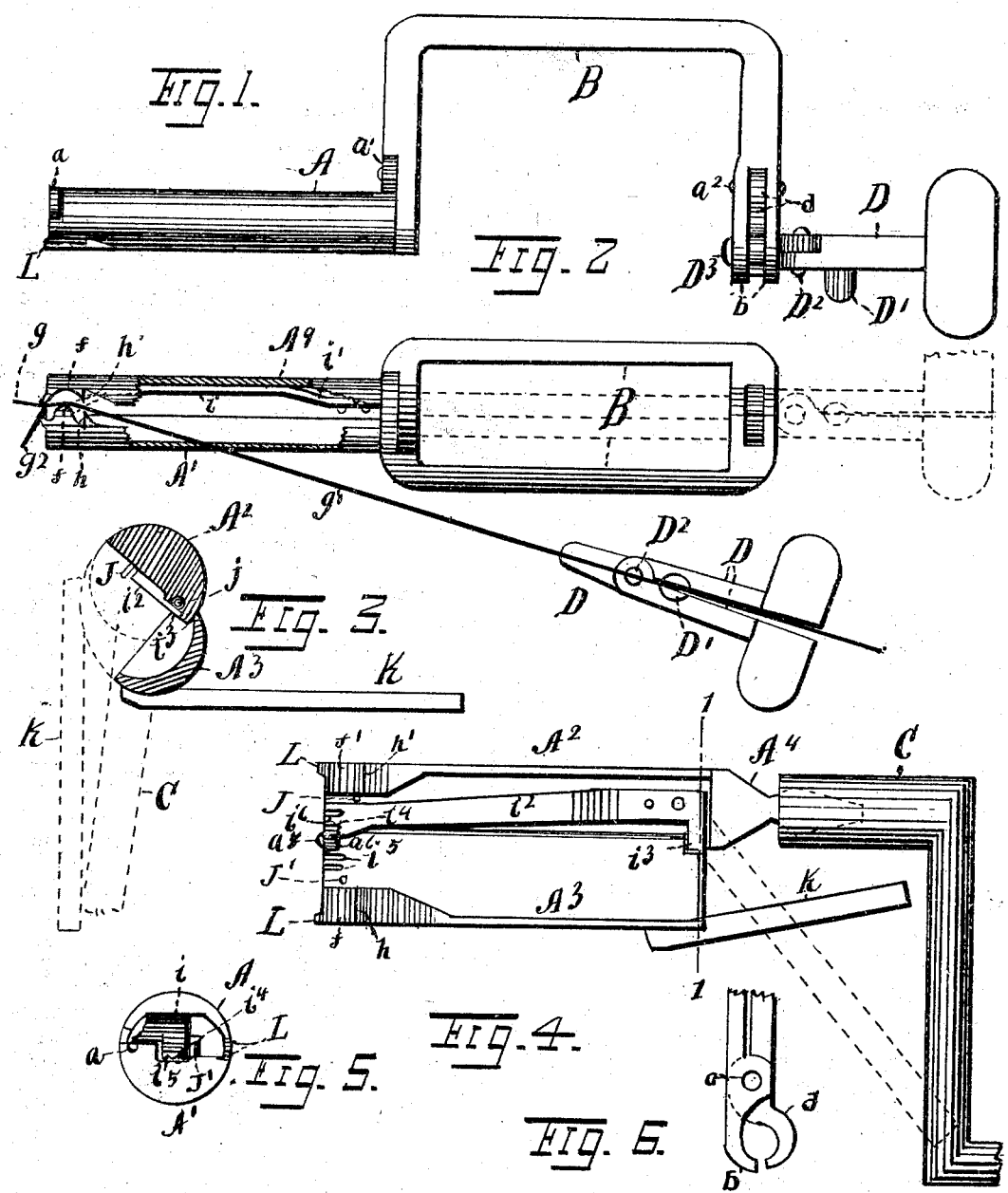
Witnesses
A. R. Lambert
N. D. Lewis
Inventor
George Schubert

UNITED STATES PATENT OFFICE.

GEORGE SCHUBERT, OF WALNUT, TEXAS.

BALE OR BUNDLE WIRING TOOL.

SPECIFICATION forming part of Letters Patent No. 502,323, dated August 1, 1893.

Application filed November 11, 1892. Serial No. 451,624. (No model.)

*To all whom it may concern:*

Be it known that I, GEORGE SCHUBERT, a citizen of the United States, residing at Walnut, in the county of Bosque and State of Texas, have invented certain new and useful Improvements in Bale or Bundle Wiring Tools; and I do hereby declare the following to be a full, clear, and exact description of the invention, such as will enable others skilled in the art to which it appertains to make and use the same, reference being had to the accompanying drawings, forming part of this specification, in which drawings—

Figure 1 is a side view of my invention. Fig. 2 is a plan view of same with the wire in position and the tool partly closed. Fig. 3 is a sectional view on line 1—1 of Fig. 4 showing a modified form of the tool. Fig. 4 is a view of the modified form wide open. Fig. 5 is a bottom end view of the tool, and Fig. 6 is a plan view of the upper hinge of the brace shown in Figs. 1 and 2.

This invention relates to a new and useful tool to tie (twist) two ends of the wire together after said wire has been passed around the bale, or to tighten the wire after placed around the bale, by grasping said wire on any desired point. Said tool is especially adapted to be used at baling presses, to grasp and twist the ends of the wire together after said wire has been drawn taut around the bale. By the use of this tool straight wire direct from the roll can be used with far more success and in less time instead of using the ready made loop wire now in general use. This tool is so constructed that two or more wires can be grasped at two different times independent of each with one movement of the hand, not loosening the grip on the first wire while the second wire is grasped and cut off. The tool is constructed either in connection with a brace or arranged so that it can be used in a common bit brace, as shown in the modified form.

Referring to the drawings, A designates the shank of the tool, and B the sweep. Said shank A, and sweep B are formed in two halves hinged together at $a$, $a'$, and $a^2$. The hinge $a$ is a common hinge, and the hinge $a'$ is a common tong hinge, while the upper hinge $a^2$ is a facing hinge as shown in Fig. 6. The parts do not cross each other.

D designates the knob formed in two halves as shown and pivoted together at $D^2$. One of said halves has a cone like extension $D^3$ extending beyond the pivot $D^2$, of proper size and length to enter the opening formed by the parts $d$, $d$, and $b$ when the sweep B is closed.

$D'$ are projections or jaws on the two halves D forming clamps by which the wire can be grasped and drawn taut, as seen in Fig. 2.

The shank A is of proper length and size so that it can be inserted between the bars of a baling press to twist the wire direct at the bale; and is preferably made in two halves $A'$, and $A^9$ properly hollowed out to gain lightness and room for the parts hereinafter described.

$i$ designates a spring secured with its upper end $i'$ to near the upper end of the half $A^9$, and having its lower end curved from said half as shown in dotted lines in Figs. 2 and 5, with its lower end flared and with one edge against the projection formed by the bearing $a$, with its remaining portion projecting slightly past the center of the tool. $i^4$ are grooves in the lower end of said spring $i$. $i^5$ are similar grooves in the lower body of the opposite half $A'$ shown in Figs. 4 and 5; one or more such grooves can be formed to operate on one or more wires or one or more sizes of wires.

$f$ designates an elevation in the half $A'$ and $f'$ is a corresponding depression in the opposite half $A^9$, forming a clamp to grasp and hold the second wire as the knives or shears $h$ and $h'$ sever said wire. The front and extreme end L of the shank are slightly projecting and in position to grasp a straight wire to twist it if so desired.

J and $J'$ are small projections or studs near the lower ends of the shank, the one to prevent the second wire from shifting too far in past the clamp and shears.

Figs. 3 and 4 show a modified form of the shank of said tool, constructed so that it can be used in a common bit-brace, and each half made so that it can be readily cast in a sand or iron mold, to promote cheapness of construction. $a^6$ designates a projection formed on the lower end of the half $A^2$, perforated to receive the pole $a^5$ formed on the lower end of the half $A^3$ forming the lower hinge of the two halves; near the rear side of the upper end of the half $A^2$ is formed a small depression with slight projections on each side to receive the pole $j$ of the half $A^3$, which is held in position by a projection $i^3$ on the upper end of the spring $i^2$. Said spring $i^2$ is otherwise identical with the spring $i$ shown in Fig. 2. The upper end of one of the halves (the half $A^2$ in the present instance) is provided with a common shank $A^4$ to fit any common brace C. K designates a lever pivotally secured to the other half $A^3$, so that it can be moved to a right angle to the shank or elevated as seen in dotted lines in Fig. 4.

The operation may be summarized as follows, viz: The wire $g$ is passed around the bale, and the shank of the tool wide open as seen in Fig. 3. The end of the wire $g^2$ is inserted in the end of the spring $i$ or in one of its grooves $i^4$ and the tool partly closed to the position seen in Fig. 2, thus clamping said wire $g^2$. The wire $g'$ is now placed within the tool and the tool partly turned to prevent said wire $g'$ from slipping out, when said wire $g'$ is grasped and drawn tight around the bale and then the tool is closed by pressing the sweeps B together thus clamping and also cutting the wire off. The knob D is now inserted in the opening formed by the ends $d\ d$, and $b$ and thus preventing the tool from opening when the sweep B is rotated when the wires $g$ and $g^2$ are twisted until a proper tie is formed. If the wire around the bale has not the desired tension it may be grasped with the tool at any place, (preferably at the corner of the bale,) and twisted until the desired tension is attained. The modified form shown in Figs. 3 and 4, is similarly operated. The lever $k$ is so arranged as to rest on the lower edge of the sweep of the brace C when the tool is closed, thus preventing the tool from opening, and the brace is rotated.

Having thus described my invention, what I claim, and desire to secure by Letters Patent, is—

1. In a bale or bundle wiring tool, formed of a shank, formed in two halves, to be inserted between the bars of a baling press, a spring within said shank to clamp the end of the wire, clamping and cutting jaws near the lower end of said shank to clamp and cut the wire after being drawn firmly around the bale, means to close and rotate said shank to form a twist to tie the wire as and for the purpose described.

2. The combination, of a bale or bundle wiring tool, formed of a brace and shank, formed in two halves, a detachable knob D having the projections D' and the extension $D^3$, as shown and for the purpose described.

3. A bundle or bale wiring tool formed of a shank formed of two halves, and having two separate clamping jaws to receive two or more wires at two different times substantially as described.

4. A bundle or bale wiring tool formed of a shank formed in two halves and hollowed out, a spring $i$ in one of said halves the body of the other half adapted to close against the lower end of said spring, clamping jaws $f, f'$, and cutting jaws $h, h'$, in connection with a brace as and for the purpose described.

5. A bundle or bale wiring tool formed of a hollow shank formed in two halves a spring $i$ in one of said halves, having its lower end widened and with one edge resting against the projecting hinge $a$, clamping jaws $f, f'$, and cutting jaws $h, h'$ near the lower and front part of said shank, as shown and described.

6. A bundle or bale wiring tool formed of a hollow shank formed in two halves, a spring $i$ in one of said halves, having one or more grooves $i^4$ in its lower end corresponding grooves in the body of the opposite half, as shown, clamping jaws $f, f'$, and cutting jaws $h, h'$, near the lower and front part of said shank, as and for the purpose described.

7. A bundle or bale wiring tool formed of a hollow shank formed of two halves, a spring $i$ in one of said halves, the lower end of the body of the opposite half adapted to close against the lower end of the spring $i$, studs J, J', in said shank, clamping jaws $f, f'$, and cutting jaws $h\ h'$ near the lower end and in front of the studs J, J', as described.

8. In combination with a bale or bundle wiring tool, formed of a brace and shank, formed in two halves, clamping and cutting jaws near the lower end of said shank, gripping jaws L L, on the lower end of said shank, in connection with a brace as and for the purpose described.

In testimony whereof I have affixed my signature in presence of two witnesses.

GEORGE SCHUBERT.

Witnesses:
 JAS. DOWNEY,
 M. BLART.